United States Patent [19] … [11] 4,102,561
Hawk et al. … [45] Jul. 25, 1978

[54] OPTICAL WAVEGUIDE CONNECTOR

[75] Inventors: Robert M. Hawk, Bath; Frank L. Thiel, Painted Post, both of N.Y.

[73] Assignee: Corning Glass Works, Corning, N.Y.

[21] Appl. No.: 592,362

[22] Filed: Jul. 2, 1975

[51] Int. Cl.² .............................................. G02B 5/14
[52] U.S. Cl. .................................................. 350/96.21
[58] Field of Search ....................... 350/96 C, 96 WG

[56] References Cited

U.S. PATENT DOCUMENTS

| | | | |
|---|---|---|---|
| 3,734,594 | 5/1973 | Trambarulo | 350/96 C |
| 3,768,146 | 10/1973 | Braun et al. | 350/96 WG |
| 3,864,018 | 2/1975 | Miller | 350/96 C |
| 3,871,744 | 3/1975 | Bridger et al. | 350/96 C |
| 3,885,859 | 5/1975 | Dalgleish et al. | 350/96 C |
| 3,904,269 | 9/1975 | Lebduska et al. | 350/96 C |
| 3,912,574 | 10/1975 | Cherin et al. | 350/96 C |
| 3,920,432 | 11/1975 | Smith | 350/96 C |
| 3,966,299 | 6/1976 | Osterfield et al. | 350/96 C |

Primary Examiner—John K. Corbin
Assistant Examiner—Stewart Levy
Attorney, Agent, or Firm—William J. Simmons, Jr.; Walter S. Zebrowski; Clarence R. Patty, Jr.

[57] ABSTRACT

An optical fiber connector comprising a first resilient member having elongated grooves in the surface thereof into which fibers to be optically connected are disposed end-to-end. A second resilient member is urged against that portion of the fibers opposite the first member, thereby causing a slight deformation of the second member and the groove forming walls. The substantial equilibrium of forces applied to each pair of fibers by the resilient members causes their axes to become aligned. A longitudinal force applied to each fiber urges the endface thereof into contact with the endface of the fiber that is to be connected thereto.

10 Claims, 13 Drawing Figures

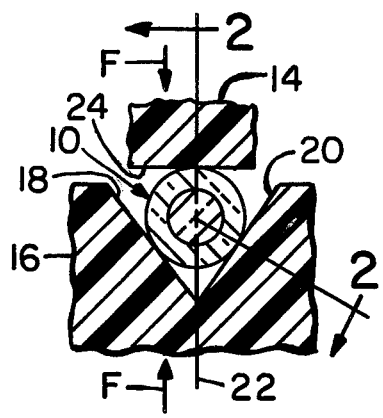
Fig. 1
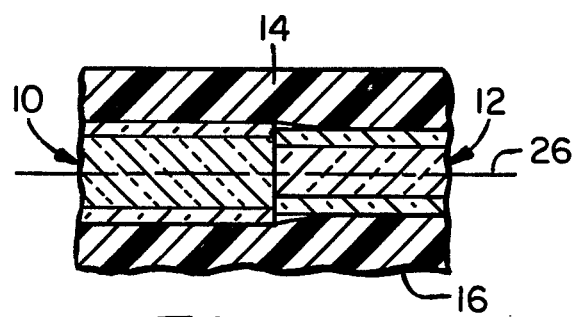
Fig. 2
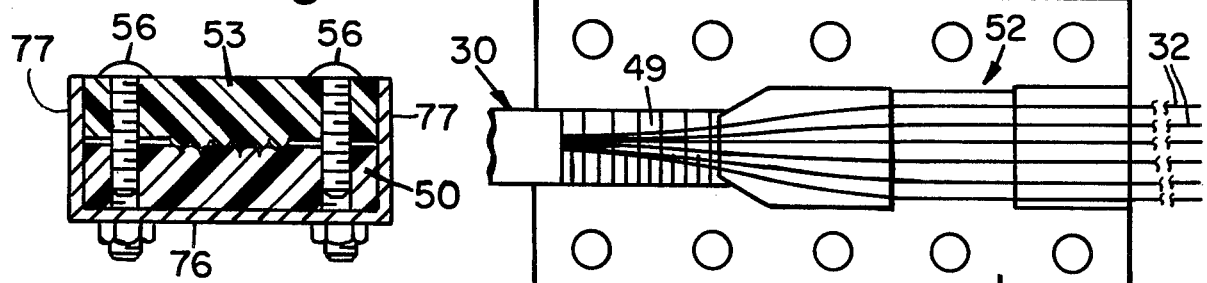
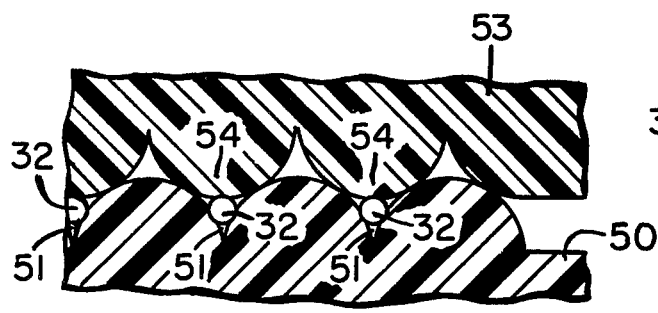
Fig. 6
Fig. 5
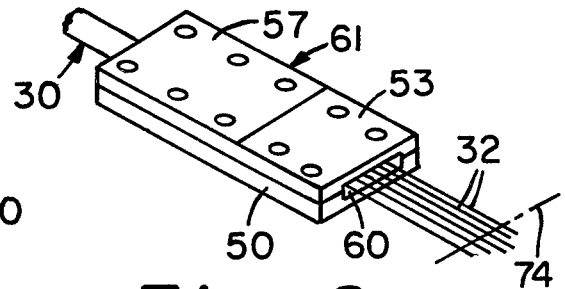
Fig. 7
Fig. 8
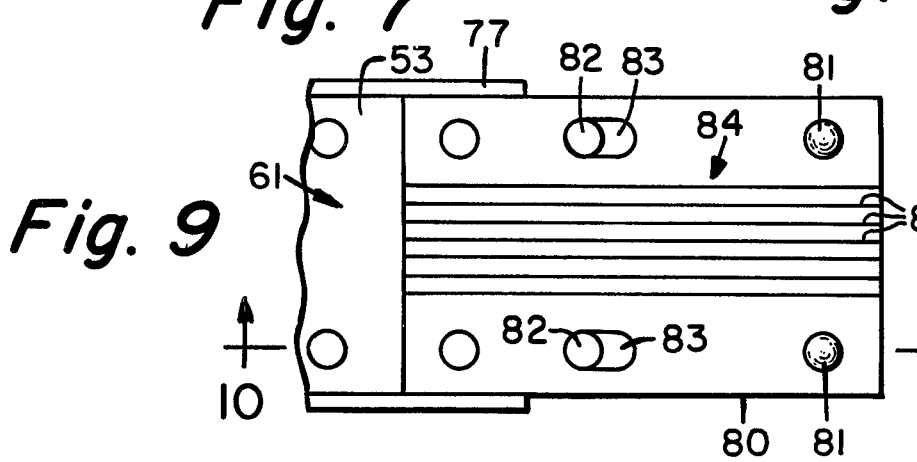
Fig. 9

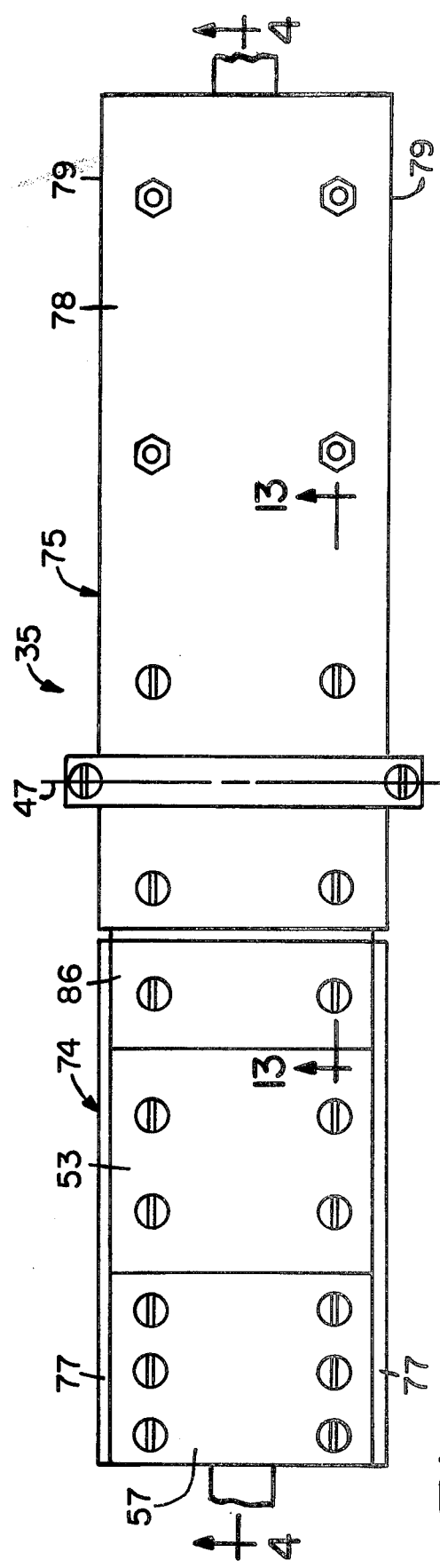
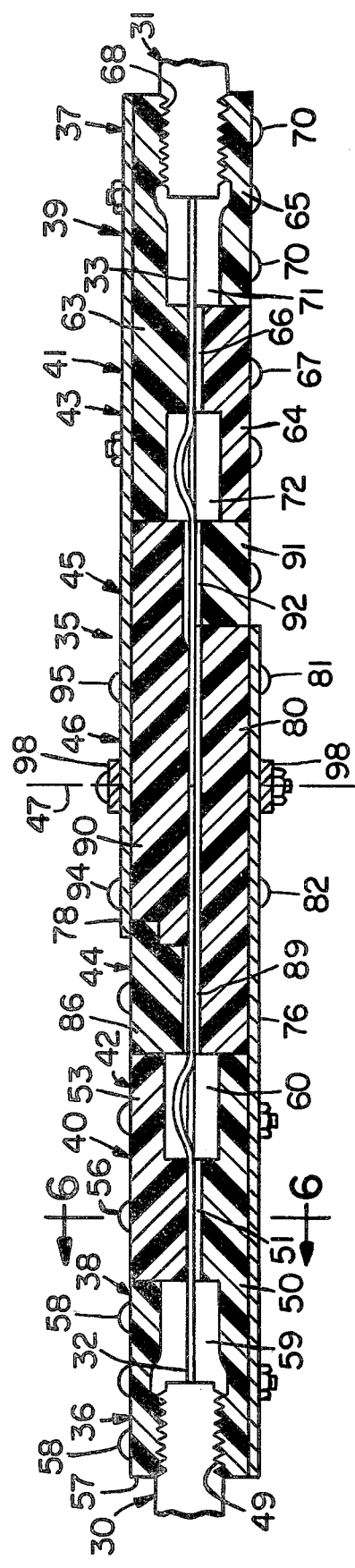
Fig. 3
Fig. 4

OPTICAL WAVEGUIDE CONNECTOR

CROSS-REFERENCE TO RELATED APPLICATION

This application is related to U.S. patent application Ser. No. 498,329 entitled "Optical Waveguide Connector" filed by R. M. Hawk on Aug. 19, 1974 now abandoned.

BACKGROUND OF THE INVENTION

Recent advances in the fabrication of ultratransparent materials have demonstrated that fibers are a promising transmission medium for optical communication systems. These light transmitting fibers, which are referred to as optical waveguides generally consist of a transparent core surrounded by a layer of transparent cladding material having a refractive index which is lower than that of the core. A low loss optical waveguide and a method of making the same are disclosed in U.S. Pat. No. 3,659,915. The waveguide described in that patent comprises a cladding layer of fused silica and a core of fused silica doped with one or more materials that selectively increase the index of refraction of the core above that of the cladding.

If such fibers are to be used in optical communication systems, means must be provided for quickly and conveniently connecting sections of fiber together in the course of their use. Such means must cause light to be coupled from one fiber to another with little loss of signal, i.e., with low insertion loss. When two optical waveguides are joined end-to-end, insertion loss can result from center-to-center mismatch, angular misalignment of the fiber axes, fiber-to-fiber separation, rough end finish and Fresnel reflections. For example, consider the insertion loss which may occur when two fused silica optical waveguides of the type disclosed in the aforementioned U.S. Pat. No. 3,659,915 are joined end-to-end. For this illustration, it is assumed that the fibers have a diameter of 5 mils and a cladding thickness of 1 mil. If misregistration of the centers of the two fibers is the only loss mechanism, a loss of about 1 db occurs if the centers thereof are separated by 0.5 mil. For reasonably low insertion losses to be achieved, the centers of the fiber endfaces must therefore be registered within 0.5 mil. Futhermore, due to the low numerical aperture of present optical waveguides, the fiber axes must be substantially aligned, i.e., they must be aligned to within 3° to keep insertion losses less than about 1 db, assuming no other loss mechanisms are operative. Since light diverges from the fiber axis as it radiates from a fiber, some light is lost if the endfaces of the fibers are separated; therefore, the endfaces of the fibers should be maintained in virtual contact. Fiber-to-fiber separation also implies an insertion loss due to Fresnel reflections at the two glass-air interfaces. This loss, however, can be substantially eliminated by disposing between the fiber endfaces a layer of index matching material such as an oil or other fluid having a refractive index of about 1.5.

Minimizing these insertion losses becomes especially difficult when cables or bundles of fibers are to be connected. The axes of all fibers in both cables should be substantially parallel, the endfaces of the fibers in one cable should be touching the endfaces of the fibers in the other cable, and the endface of a fiber in one cable should be substantially centered with respect to that of a corresponding fiber in the other cable. A connector exhibiting the aforementioned features is disclosed in said related application Ser. No. 498,329. Briefly, the connector of that application comprises a first member of resilient material having at least one elongated V-shaped groove in a surface thereof for receiving a pair of fibers to be connected, the two walls forming the V-shaped groove being substantially symmetrical about a first plane and the axes of the pair of fibers being disposed in the first plane. A second member of resilient material having at least one elongated elevated portion is aligned with the groove and is adapted to contact that surface of the fibers opposite the groove. Means are provided for applying a force to the first and second members in a direction perpendicular to the fiber axes and in the first plane, the force tending to bring them together and deform them against the adjacent surfaces of the fibers, thereby simultaneously aligning and mechanically securing the fibers. Although the connector disclosed in said related application can be employed to connect the fibers of two cables, it is extremely difficult to cut the fibers of each cable to the precise length necessary to provide contact between the endfaces of all fibers of one cable with the corresponding endfaces of the fibers of the other cable.

SUMMARY OF THE INVENTION

It is therefore an object of the present invention to provide a low loss in-line connector for use between two optical waveguide cables.

Another object is to provide a device for connecting optical fibers in a mechanically sound and optically efficient manner.

A further object is to provide an optical fiber connector in which end separation between connected fibers is eliminated.

Briefly, the connector of the present invention comprises a first member having a groove in a surface thereof for receiving a pair of fibers to be connected and means for maintaining the fibers in the groove. Means are provided for applying an axial force to each of the fibers which causes the endface thereof to bear against the endface of the fiber being connected thereto.

BRIEF DESCRIPTION OF THE DRAWINGS

FIGS. 1 and 2 illustrate the axial alignment feature of the preferred embodiment of the present invention.

FIG. 2 is a cross-sectional view taken along the lines 2—2 and extending to the center of the optical fibers illustrated in FIG. 1.

FIG. 3 is a plan view of a preferred embodiment.

FIG. 4 is a cross-sectional view taken along lines 4—4 of FIG. 3.

FIG. 5 is a plan view of a portion of the connector of FIGS. 3 and 4 during an initial step in the assembly of the connector.

FIG. 6 is a cross-sectional view taken along lines 6—6 of FIG. 4.

FIG. 7 is an enlarged cross-sectional view of a central portion of FIG. 6.

FIG. 8 is an oblique view of a subassembly of the connector.

FIG. 9 is a plan view of the grooved fiber overlap member.

DESCRIPTION OF THE PREFERRED EMBODIMENTS

Figure 10:
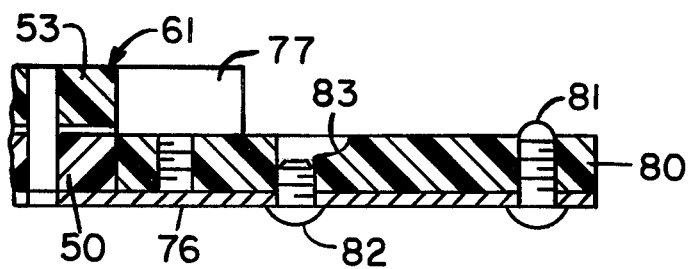
FIG. 10 is a cross-sectional view taken along lines 10—10 of FIG. 9.

It is to be noted that the drawings are illustrative and symbolic of the invention, and there is no intention to indicate scale or relative proportion of the elements shown therein.

The preferred embodiment of the present invention employs the same fiber axis alignment principle which is employed in said related application, but this invention applies to other types of connectors as well. This principle is illustrated in FIGS. 1 and 2 wherein two cylindrically shaped optical fibers 10 and 12 are supported between alignment members 14 and 16 of resilient material such as rubber, plastic or the like. Member 16 has an elongated groove formed by two walls 18 and 20 which are symmetrically disposed about a plane represented by broken line 22. The groove in member 16 is preferably V-shaped so that the walls thereof engage the fibers along two noncontiguous portions of their cylindrical sidewalls, and that portion of the groove at which the sidewalls intersect remains free from contact with the fibers. Surface 24 is also preferably flat or convex so that it contacts the fibers at elongated areas that are spaced from those elongated areas at which the groove makes contact.

If cylindrical fibers 10 and 12 were merely placed end-to-end in the groove defined by walls 18 and 20, their axes would be in plane 22 even if their diameters were not equal. It has been found that the axes of the two abutting fibers can be substantially aligned by applying a force, which is represented by arrows F, to members 14 and 16. Force F tends to bring members 14 and 16 together, thereby causing these members to deform against the surfaces of fibers 10 and 12 and also causing the fiber axes to move in plane 22 until they are substantially aligned along a common axis 26 as shown in FIG. 2.

A connector based upon the principle illustrated in FIGS. 1 and 2 can provide very low loss coupling between a pair of optical fibers provided that the fiber endfaces are in contact. However, when the fibers of two fiber cables are to be connected in this manner, it is difficult to sever the fibers of each cable at precisely the correct length so that fiber-to-fiber separation is avoided at each junction in the connector. In a preferred embodiment of the present invention, which is illustrated in FIGS. 3 and 4, means are provided for urging the endface of each of a plurality of fibers of a first cable 30 into contact with the endface of a corresponding fiber of the other cable 31.

Connector 35 includes cable clamps 36 and 37, fiber splaying regions 38 and 39, tight fiber clamps 40 and 41, fiber accumulation regions 42 and 43, loose fiber clamps 44 and 45, and a fiber mating region 46 in which the endfaces of a pair of connected fibers meet near the nominal mating plane represented by broken lines 47. The feature of the present invention whereby the endfaces of a coupled pair of fibers are urged into contact is best understood by considering the step-by-step process of loading the fibers into the connector.

Referring to FIG. 5, the cable jacket is stripped from the end portion of cable 30 exposing a length of optical fibers 32. The end of the cable jacket is disposed in cable receiving depression 49 of cable and fiber clamp base 50. One of the fibers 32 is placed in each of the grooves 51 of grooved region 52. Tight fiber clamp 53 is placed over one end of clamp base 50 so that one of the parallel ridges 54 becomes aligned with a corresponding groove 51. The manner in which optical fibers 32 are retained in grooves 51 by ridges 54 is more clearly illustrated in FIG. 7. For the sake of clarity, fibers are not illustrated in FIG. 6. Bolts 56 are inserted through clearance holes in clamp 53 and are threaded into tapped holes in clamp base 50. Bolts 56 are tightened until they meet with some resistance and are then backed off about ¼ turn. Clamp 53 thus exerts sufficient pressure to retain fibers 32 in their respective grooves, and yet those fibers are free to move longitudinally in the grooves. Cable 30 is moved entirely into cable receiving depression 49 to the position illustrated in FIG. 4, and fibers 32 slide through grooves 51. Due to the stiffness of the fibers it is much simpler to place them in grooves 51 while cable 30 is in the position illustrated in FIG. 5. If necessary, cable 30 can be situated completely out of depression 49 while the fibers are inserted into their grooves.

Cable clamp 57 is then secured to base 50 by four bolts 58 which thread into tapped holes in base 50. Opposing recessed portions in base 50 and clamp 57 cooperate to form a cavity 59 where fibers 52 emanating from the center of cable 30 separate a distance sufficient to permit disposition of the fibers in grooves 51. Screws 56 are tightened firmly to retain the fibers in grooves 51. Thus, cable 30 and fibers 32 are firmly clamped in a first subassembly 61 comprising base 50 and clamps 53 and 57. As illustrated in FIG. 8 fibers 32 extend in a parallel array from cavity 60 which is formed by recesses in the ends of base 50 and clamp 53.

In a similar manner a second subassembly is formed for clamping cable 31 and for forming a clamped parallel array of fibers 33. As illustrated in FIG. 4, the second subassembly which comprises cable and fiber clamp base 63, tight fiber clamp 64 and cable clamp 65, is inverted in connector 35 with respect to the first subassembly. The end portion of the jacket of cable 31 is stripped to expose a length of fibers 33. Due to the fact that the second subassembly is inverted, fibers 33 are placed in the grooves 66 of fiber clamp 64, and clamp base 63 is disposed thereon in such a manner that the parallel ridges thereon retain fibers 33 in grooves 66. As described in conjunction with the fabrication of first subassembly 61, bolts 67 are loosely tightened, cable 31 is fully inserted into recess 68, and cable clamp 65 is affixed to that subassembly by bolts 70. Bolts 67 are then tightened firmly to retain fibers 33 in grooves 66. This subassembly includes cavities 71 and 72 which are similar to cavities 59 and 60 of the first subassembly.

As illustrated in FIG. 8, the fibers extend from the first and second subassemblies in random lengths which are too long for use in the connector. The first and second subassemblies serve as a means for holding the fiber arrays for the purpose of cutting the fibers to the required length. The end surface of the assemblies from which the fibers protrude serves as a reference point for the cutting operation. Each fiber is cut to a length sufficient for it to extend just beyond the nominal mating plane 47 of FIG. 4. As illustrated in FIG. 8, fibers 32 are cut so that their ends fall upon line 74 which is parallel to the end of subassembly 61 from which the fibers protrude. For reasons which will become evident, it is not critical that fibers 32 be cut to exactly the same length. In a similar manner, fibers 33 are also cut to the desired length.

Connector 35 includes two metallic support members 74 and 75, one of which is initially secured to each half of the connector. Member 74 consists of a base plate 76 and sidewalls 77. Member 75 consists of base plate 78 and sidewalls 79. Whereas sidewalls 79 extend the entire length of faceplate 78, sidewalls 77 extend to sidewalls 79 as illustrated in FIG. 3. Base plates 76 and 78 overlap in the completed connector as illustrated in FIG. 4.

To complete the left half of connector 35 overlap member 80 is bolted to base plate 76 by bolts 81 and 82 as illustrated in FIGS. 9 and 10. For reasons to be hereinafter described, bolts 81 slightly protrude from the surface of member 80, and bolts 82 do not extend to that surface. Slots 83 extend from the unused portion of the tapped hole into which bolts 82 are threaded toward bolts 81. The first subassembly 61 is then disposed in the remaining portion of support member 74 so that the end thereof from which fibers 32 extend is butted against member 80. Grooves 51 of base 50 are aligned with grooves 89 in grooved region 84 of member 80 so that fibers 32, which extend from aperture 60 of subassembly 61, fall into the grooves 89 of region 84.

Figure 11:
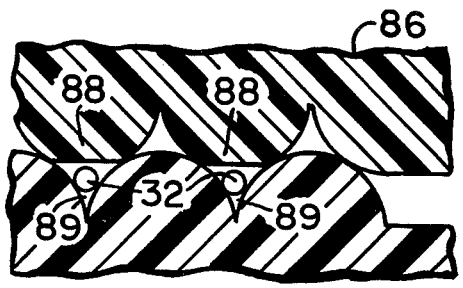
FIG. 11 is an enlarged cross-sectional view of the central portion of a loose fiber clamp.

Loose fiber clamp 86 is then bolted to fiber overlap member 80. The cross-sectional view of member 80 and loose fiber clamp 86 is similar to the cross-sectional view illustrated in FIG. 6 except that parallel ridges 88 of clamp 86 are flattened as illustrated in FIG. 11 so that fibers 32 are retained in grooves 89 but are free to move longitudinally therein.

The right half of connector 35 is completed by bolting overlap member 90 to base plate 78. The second subassembly consisting of fiber clamp base 63, tight fiber clamp 64 and cable clamp 65 is then bolted to base plate 78. Parallel ridges extending along member 90 are aligned with parallel ridges extending along fiber clamp base 63. Thus, fibers 33, which protrude in a parallel array from cavity 72, extend along the parallel ridges of member 90. Fiber clamp 91 is then bolted to member 90, the ridges of which are flattened in the vicinity of clamp 91. The flattened portion of the ridges of member 90 retain fibers 33 in grooves 92 of member 91, but the fibers are free to move longitudinally in those grooves. A cross-sectional view through member 90 and clamp 91 would appear similar to that illustrated in FIG. 11. The remainder of the ridges of member 90 which extend beyond clamp 91 are rounded and are similar to the ridges formed in tight fiber clamp 53 and clamp base 63.

Figure 12:
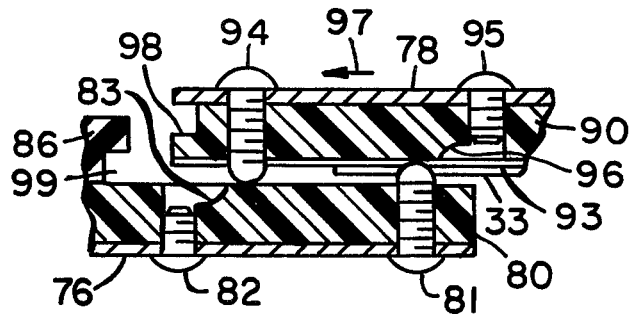
FIG. 12 is a cross-sectional view of the central portion of the connector during final assembly thereof.

The right and left halves of connector 35 are joined in the manner illustrated in FIG. 12. In this figure one of the fibers 33 can be seen extending across one of the parallel ridges 93 of member 90. Bolt 94 protrudes through the surface of member 90 and bolt 95 does not quite extend to the surface of member 90. Slot 96 extends from the tapped hole in which bolt 95 is threaded toward bolt 94.

Figure 13:
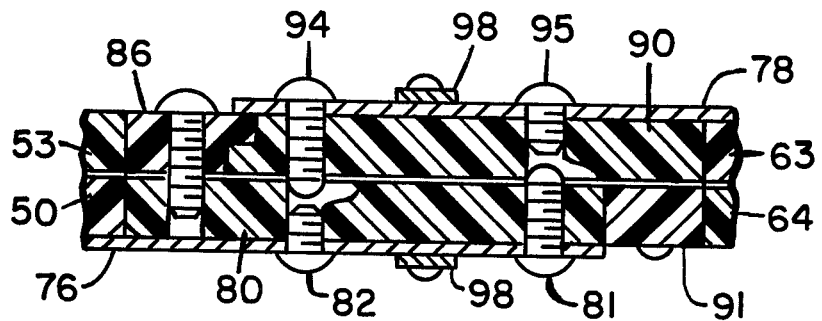
FIG. 13 is a cross-sectional view taken along lines 13—13 of FIG. 3.

When the right and left halves of connector 35 are brought together the raised portions of bolts 81 and 94 contact the surfaces of members 90 and 80, respectively, thereby preventing optical fibers 33 from falling into the grooves of member 80 at such a position that the ends of fibers 32 and 33 are separated by a considerable distance. Absent this means for initially maintaining fibers 33 above the grooves of member 80, those fibers could enter the grooves and slide longitudinally therein for a considerable distance prior to contacting fibers 32 which are already in those grooves. This longitudinal movement of fibers 33 could cause contamination of the endfaces thereof. As the right hand member of connector 35 is moved in the direction of arrow 97 of FIG. 12, the protruding portions of bolts 81 and 94 fall into slots 96 and 83, respectively, in such a position that fibers 33 fall into the grooves 89 of member 80 with only a slight separation between the endfaces of fibers 32 and 33. Further movement of member 90 in the direction of arrow 97 initially causes the fiber endfaces to contact, and as tab 98 becomes fully seated within slot 99, as illustrated in FIG. 13, fibers 32 and 33 are caused to slide back through loose fiber clamps 44 and 45, respectively, of FIG. 4 and accumulate in regions 42 and 43, respectively. Clamps 98 are then affixed to connector 35 and tightened. As member 90 is drawn toward member 80, a clamping force is applied to the parallel ridges of member 90 and the associated grooves of member 80 similar to force F discussed in conjunction with FIGS. 1 and 2, thereby causing the ridges and grooves to bear against the waveguide fibers disposed therebetween. The axis of each fiber of cable 30 thereby becomes substantially aligned with the axis of a corresponding fiber of cable 31. This optical connection of fibers may be broken and re-made numerous times without removing the fibers from the housings, and thus can perform the function of a multifiber, multichannel optical cable connector.

In addition to possessing the aforementioned fiber axis alignment mechanism, which is the subject matter of said related application Ser. No. 498,329, the connector of the present invention includes means for applying an axial force to each fiber which causes the endface thereof to bear against the endface of the mating fiber. This function is facilitated by the loose fiber clamps 44 and 45 which retain the fibers in such a manner that they cannot slip normal to their axes, i.e., they cannot escape from their channels, but at the same time they are free to move along their axes at the time the fiber connection is made. At that time the excess fiber length is accumulated in cavities 60 and 72 where the fibers slightly bend or bow to develop the aforementioned axial force which insures fiber-to-fiber contact.

Cable clamps 36 and 37 firmly retain cables 30 and 31, respectively, so that any tension on the cable is transferred to the connector hardware rather than to the optical fibers. Tight clamps 40 and 41 firmly retain the optical fibers so that they slip neither normal to nor along their axes. These clamps allow the fibers to be cut to the proper lengths and undergo any other preparatory functions such as cleaning before final assembly of the connector.

The feature of the present invention whereby an axial force is applied to each fiber to ensure fiber-to-fiber contact, is not limited to connectors having V-shaped grooves of the type described hereinabove. For example, a connector employing this principle could embody U-shaped grooves such as those disclosed in the publication: C. G. Someda, "Simple, Low-Loss Joints Between Single-Mode Optical Fibers", Bell Systems Technical Journal, Vol. 52, No. 4, Apr. 1973, pp. 583–596. The shape of the groove is immaterial, provided the connector includes means for maintaining the fibers in the grooves and means for exerting an axial force on the fibers tending to urge together the endfaces of each pair of mating fibers.

We claim:

1. An optical fiber connector comprising means defining an elongated aperture for receiving the end portions of a pair of fibers to be connected, means disposed remote from the endface of at least one of said fibers for tightly clamping said fiber, means disposed between said means for tightly clamping said fiber and said aperture defining means for loosely clamping said fiber, and a region disposed between said means for tightly clamping said fiber and said means for loosely clamping said fiber wherein said fiber is bowed, the tendency of said fiber to straighten providing a force which urges the endface thereof to bear against the endface of the other of said fibers.

2. An optical fiber connector for connecting each of a first plurality of optical fibers of a first cable to a corresponding one of a second plurality of fibers of a second cable, said connector comprising a first member having a plurality of elongated grooves, each groove receiving a pair of fibers, one of said pair of fibers being from each of said first and second cables, means for maintaining said fibers in said grooves, and means for applying an axial force to at least one of the fibers of each pair of fibers which causes the endface thereof to bear against the endface of the other of said pair of fibers, the means for applying a force to any one of said fibers being independent from the means for applying a force to any other of said fibers, said means for applying an axial force comprising means for tightly clamping said fibers a given distance from the endfaces thereof, and means disposed between said means for tightly clamping and said means for maintaining said fibers in said grooves for permitting said fibers to bow, the force exerted by said fibers which tends to straighten the bowed portion thereof causing said endfaces to bear against one another.

3. An optical fiber connector for connecting each of a first plurality of optical fibers of a first cable to a corresponding one of a second plurality of fibers of a second cable, said connector comprising means defining a plurality of elongated apertures, each aperture receiving a pair of fibers, one of said fibers being from each of said first and second cables, and means for applying an axial force to at least one of the fibers of each of said pair of fibers which causes the endface thereof to bear against the endface of the other of said pair of fibers, the means for applying a force to any one of said fibers being independent from the means for applying a force to any other of said fibers, said means for applying an axial force comprising means for tightly clamping said at least one of the fibers of each of said pairs of fibers a given distance from the endface thereof, said clamped fiber being bowed between said means for tightly clamping and said aperture defining means.

4. An optical fiber connector for connecting each of a first plurality of optical fibers of a first cable to a corresponding one of a second plurality of fibers of a second cable, said connector comprising means defining a plurality of elongated apertures, each aperture receiving a pair of fibers, one of said fibers being from each of said first and second cables, and means for applying an axial force to both of the fibers of each of said pair of fibers which causes the endface of each fiber of said pair of fibers to bear against the endface of the other of said pair of fibers, the means for applying a force to any one of said fibers being independent from the means for applying a force to any other of said fibers.

5. An optical fiber connector for connecting each of a first plurality of optical fibers of a first cable to a corresponding one of a second plurality of fibers of a second cable, said connector comprising a first member of resilient material having a plurality of elongated V-shaped grooves in a surface thereof for receiving corresponding pairs of said first and second plurality of optical fibers, a second member of resilient material having a plurality of parallel elevated portions aligned with said grooves, each elevated portion forming with its associated groove an aperture which is adapted to receive a pair of fibers to be connected, each elevated portion also being adapted to contact that surface of said pair of fibers opposite the associated groove, means for applying a force to said first and second members in a direction perpendicular to the axes of said fibers, said force tending to bring said members together and causing said members to deform against the adjacent surfaces of said fibers, thereby simultaneously aligning and mechanically securing said fibers, and means for applying an axial force to each of said fibers which causes the endface thereof to bear against the endface of the fiber connected thereto, said means for applying an axial force to each of said fibers comprising first and second tight fiber clamps having grooves therein which are axially aligned with the grooves of said first member, said first and second tight fiber clamps being disposed at opposite ends of said first member and being separated therefrom by first and second fiber accumulation regions, respectively, wherein said fibers are bowed.

6. A connector in accordance with claim 5 further comprising first and second loose fiber clamps disposed between said first member and said first and second fiber accumulation regions, respectively, said loose fiber clamps having grooves which are axially aligned with the grooves of said first member, said fibers being slidable in the grooves of said loose fiber clamps.

7. An optical fiber connector for connecting each of a first plurality of optical fibers of a first cable to a corresponding one of a second plurality of fibers of a second cable, said connector comprising a first member having a plurality of elongated grooves, each groove receiving a pair of fibers, one of said pair of fibers being from each of said first and second cables, means for maintaining said fibers in said grooves comprising a second member having a surface adapted to contact that surface of the fibers opposite said grooves and means for applying a clamping force to said first and second members which tends to bring said members together thereby retaining said fibers in said grooves, said means for maintaining said fibers in said grooves causing said fibers to contact the sidewalls which form said grooves, and means for applying an axial force to each of the fibers of each pair of fibers which causes the endface of each fiber to bear against the endface of the other of said fiber in each pair of fibers, the means for applying a force to each of said fibers being independent from the means for applying a force to any other of said fibers.

8. A connector in accordance with claim 7 wherein said first and second members are formed of resilient material and said groove is V-shaped.

9. A connector in accordance with claim 8 wherein said means for applying an axial force to each of said fibers comprises first and second tight fiber clamps having grooves therein which are axially aligned with the grooves of said first member, said first and second tight fiber clamps being disposed at opposite ends of said first member and being separated therefrom by first and second fiber accumulation regions, respectively, wherein said fibers are bowed.

10. A connector in accordance with claim 9 further comprising first and second loose fiber clamps disposed between said first member and said first and second fiber accumulation regions, respectively, said loose fiber clamps having grooves which are axially aligned with the grooves of said first member, said fibers being slidable in the grooves of said loose fiber clamps.

* * * * *